F. S. BARKS.
JOURNAL BEARING SUPPORT.
APPLICATION FILED JULY 28, 1919.
1,377,545.
Patented May 10, 1921.
2 SHEETS—SHEET 1.
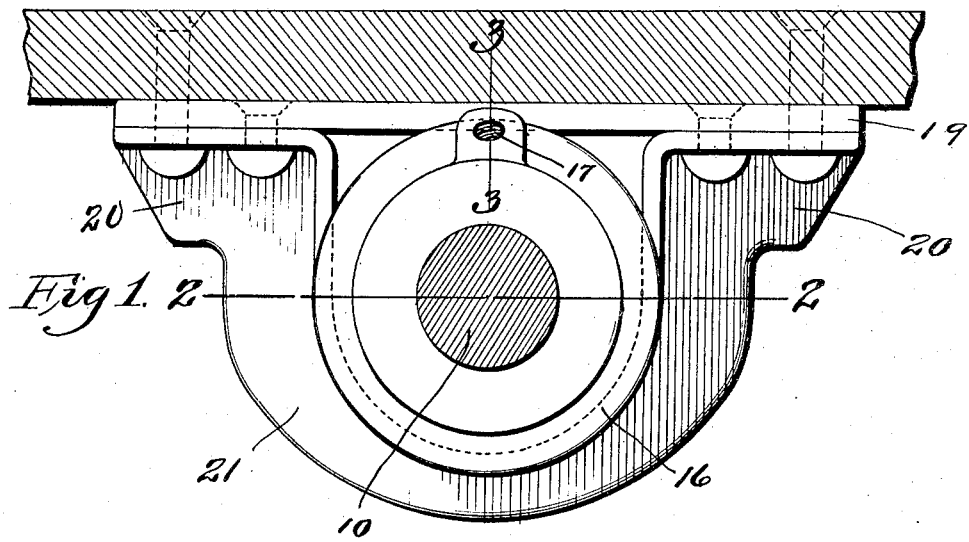
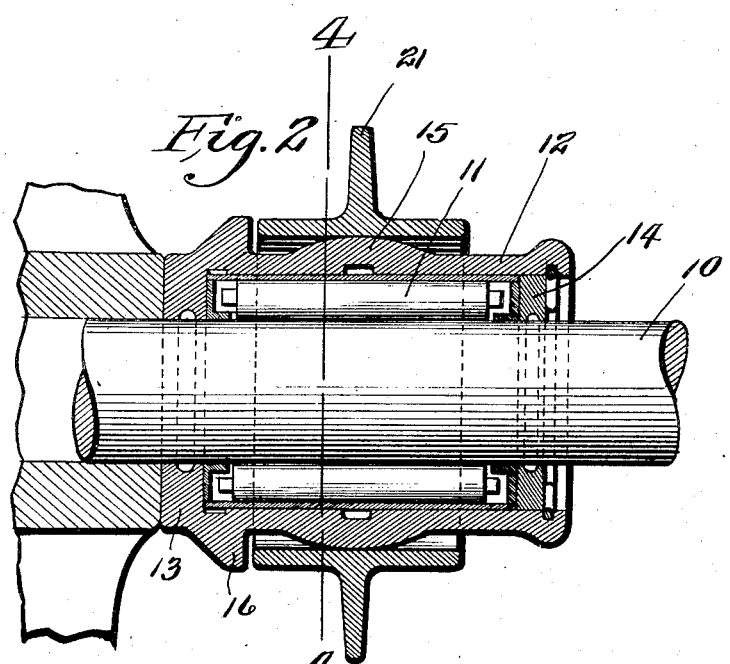
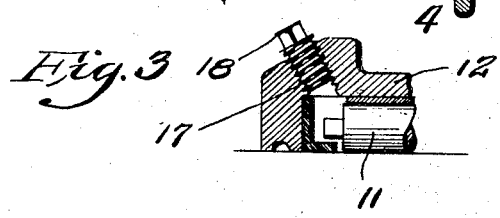
Inventor
Frank S. Barks F. S. BARKS.
JOURNAL BEARING SUPPORT.
APPLICATION FILED JULY 28, 1919.
1,377,545.
Patented May 10, 1921.
2 SHEETS—SHEET 2.
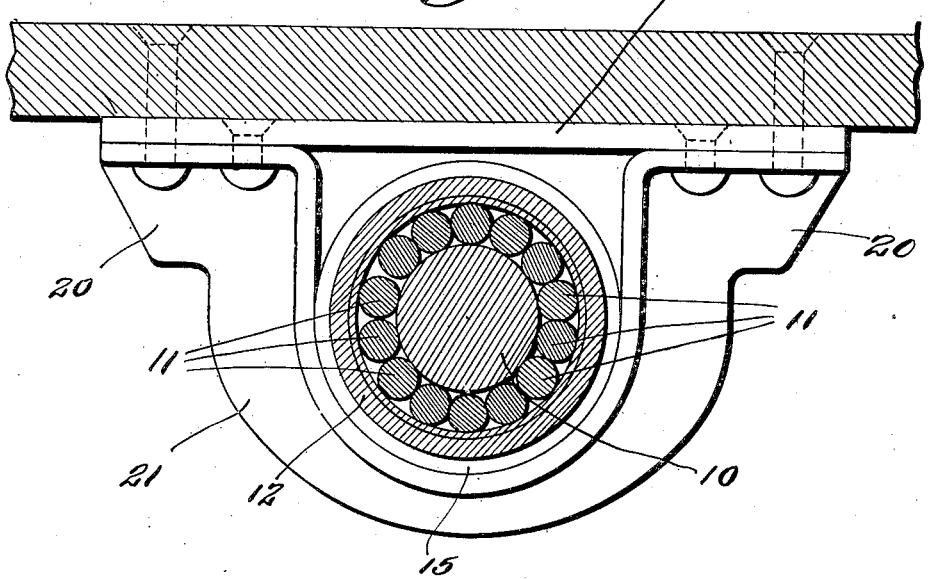
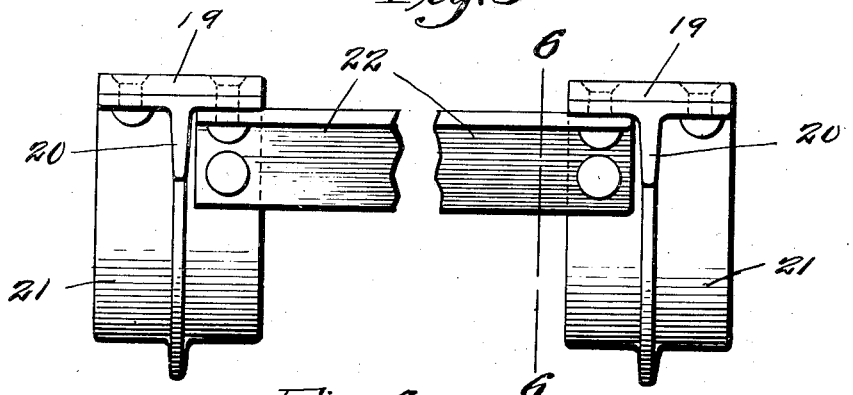
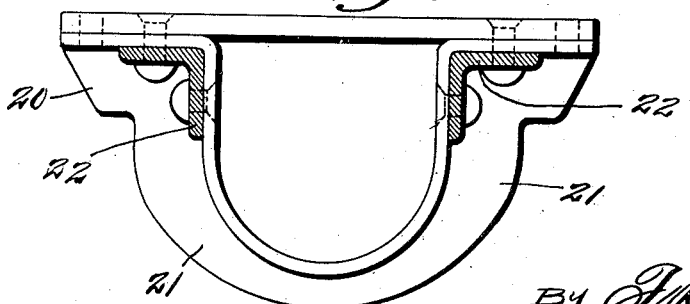
Inventor
Frank S. Barks

UNITED STATES PATENT OFFICE.

FRANK S. BARKS, OF ST. LOUIS, MISSOURI.

JOURNAL-BEARING SUPPORT.

1,377,545.                    Specification of Letters Patent.    Patented May 10, 1921.

Application filed July 28, 1919.  Serial No. 313,859.

*To all whom it may concern:*

Be it known that I, FRANK S. BARKS, a citizen of the United States, residing at St. Louis, Missouri, have invented a certain new and useful Improvement in Journal-Bearing Supports, of which the following is a full, clear, and exact description, such as will enable others skilled in the art to which it appertains to make and use the same, reference being had to the accompanying drawings, forming part of this specification.

My invention relates to new and useful improvements in journal bearings and supports therefor, and particularly the journal bearings for the axles of mining cars, the principal objects of my invention being to provide a relatively simple and efficient bearing which, by virtue of its construction, can be readily applied to or removed from the axle; to provide a self-alining bearing in its support; and, further, to provide a relatively simple, strong and durable support for the journal bearing, said support being constructed of ordinary commercial shapes requiring very little machine work and therefore being inexpensive of manufacture.

With the foregoing and other objects in view, my invention consists in certain novel features of construction and arrangement of parts, hereinafter more fully described and claimed, and illustrated in the accompanying drawings, in which—

Figure 1 is an elevational view of a journal bearing of my improved construction and showing the same positioned in a support.

Fig. 2 is a horizontal section taken approximately on the line 2—2 of Fig. 1.

Fig. 3 is a detail section taken on the line 3—3 of Fig. 1.

Fig. 4 is a section taken approximately on the line 4—4 of Fig. 2.

Fig. 5 is an elevational view of a pair of journal bearing supports and showing the same connected by a cross tie member.

Fig. 6 is a section taken approximately on the line 6—6 of Fig. 5.

Referring by numerals to the accompanying drawings, 10 designates a wheel carrying axle, the journal portion of which is mounted for rotation in a bearing formed by a plurality of rollers 11, the latter being retained for operative position in a cage of suitable structure and said cage and rollers being disposed within a hollow cylindrical member 12. The outer end of this cylindrical member is provided with an inwardly projecting annular flange 13 against which the corresponding end of the cage engages and arranged within the opposite or inner end of the cylindrical member is a removable retaining ring 14 which serves to hold the roller bearing within the member 12.

Formed on the outer face of the cylindrical member 12 and at a point near its longitudinal center is an annular rib 15 having a curved outer face and formed on said member 12 near its outer end is an outwardly projecting annular flange 16. Formed through this flange and communicating with the roller chamber within the member 12 is an aperture 17 which is for the purpose of permitting the introduction of lubricant to the roller chamber and said aperture is normally closed by a removable plug 18.

The support for the journal bearing thus constructed comprises a plate 19 that is secured in any suitable manner to the car body or underframe and secured in any suitable manner to the end portions of this plate 19 are the horizontally disposed end portions 20 of a U-shaped member 21. This last mentioned member is preferably formed of a section of commercially rolled T-bar bent to proper shape and the space between the U-shaped portion thereof and the central portion of plate 19 receives the central portion of the cylindrical member 12, and when thus positioned, the curved outer face of rib 15 bears upon the upper face of the U-shaped portion and can rock thereupon so as to be self-alining with respect to the opposite bearing.

When member 12 is properly positioned within the U-shaped supporting member, the flange 16 occupies a position immediately adjacent to the outer edge of the outer flange of the part 21, as illustrated in Fig. 2.

In some instances it may be found desirable to tie the member of each pair of supports together and this is done by means of transversely disposed members 22 preferably angle bars, the ends thereof being fixed in any suitable manner to the end portions of the supports comprising the plates 19 and U-shaped members 21.  (See Figs. 5 and 6.)

A journal bearing and support of my improved construction is comparatively simple, can be easily and cheaply manufactured, can be readily assembled or taken apart, is very strong and durable, and the journal bearings are mounted in the supports so that they may rock freely in all directions, thereby enabling the members of the pair of bearings on each axle to aline themselves with each other.

It will be readily understood that minor changes in the size, form and construction of the various parts of my improved journal bearing support can be made and substituted for those herein shown and described, without departing from the spirit of my invention, the scope of which is set forth in the appended claims.

What I claim is:

1. As a new article of manufacture, a journal bearing support comprising a substantially U-shaped member, the body of which is T-shape in cross section, and a plate connecting the upper ends of the legs of said U-shaped member.

2. The hereindescribed journal bearing support comprising a pair of plates spaced apart, a substantially U-shaped member having the upper ends of its legs secured to each plate, and tie bars connecting the upper ends of the legs of one U-shaped member with the upper ends of the legs of the other member.

In testimony whereof I hereunto affix my signature this 23d day of July, 1919.

FRANK S. BARKS.